United States Patent
Crownover et al.

[15] 3,696,419
[45] Oct. 3, 1972

[54] ELECTRONIC RANGING APPARATUS WITH TRANSMITTER-RECEIVER CYCLING

[72] Inventors: Joseph W. Crownover, 6651 Avenida Mirola; John I. Wilhelm, 5962 Avenida Chamnez, both of La Jolla, Calif. 92037; Ray E. Thompson, 5351 Westknoll Lane, San Diego, Calif. 92109

[22] Filed: May 4, 1970

[21] Appl. No.: 34,358

[52] U.S. Cl. ................................................343/13 R
[51] Int. Cl. ...............................................G01s 9/06
[58] Field of Search .......343/13 R, 6 R, 6.8 R, 6.5 R; 340/1 C

[56] References Cited

UNITED STATES PATENTS

| | | |
|---|---|---|
| 2,467,299 | 4/1949 | Espenschied ............343/6.5 R |
| 2,923,935 | 2/1960 | Sinclair et al. ...........343/6.8 R |
| 3,460,139 | 8/1969 | Rittenbach................343/6 R |
| 3,181,154 | 4/1965 | Henne......................343/13 R |
| 3,427,612 | 2/1969 | Vanderhorn...............343/6 R |
| 2,921,301 | 1/1960 | Cartwright................343/13 R |

Primary Examiner—Benjamin A. Borchelt
Assistant Examiner—G. E. Montone
Attorney—White, Haefliger and Bachand

[57] ABSTRACT

The invention concerns ranging apparatus employing a closed radio circuit established between spaced stations and characterized by generating a frequency that is a function of the distance between the stations, to determine that distance.

7 Claims, 2 Drawing Figures

PATENTED OCT 3 1972        3,696,419

INVENTORS.
JOSEPH W. CROWNOVER
JOHN I. WILHELM
RAY E. THOMPSON
By White, Haefliger & Bachand
ATTORNEYS.

ELECTRONIC RANGING APPARATUS WITH TRANSMITTER-RECEIVER CYCLING

BACKGROUND OF THE INVENTION

This invention relates generally to ranging or distance measuring, and more particularly concerns the use of a closed radio circuit established between spaced stations and characterized by generating a frequency that is as a function of the distance between the stations, to determine that distance.

Various electronic systems used in the past for ranging have included the echo principle (as for example radar), the radio wave phase shift principle, and the optical laser beam transmissions. Such systems have certain disadvantages where low-cost ranging devices are called for; for example, radar and laser systems are expensive and complex, and phase shift procedures introduce ambiguities and require numerous readings on steadily diminishing wave lengths to obtain accurate distance data.

SUMMARY OF THE INVENTION

It is a major object of the invention to provide a simple, low-cost, short-distance ranging system that will eliminate the disadvantages of prior systems, the approach minimizing the complexity usually associated with distance measuring equipment, and eliminating ambiguities over the entire range of interest. As will be seen, distance is determined by usage of an electronic counter responsive to the frequency generated by the closed radio circuit, conversion tables being read in conjunction with the count rate to establish the correct distance. Also, there are no stringent requirements on frequency control of the transmitters or on frequency relationships between receiver and transmitter.

Basically, the invention is embodied in apparatus that includes:

a. transmitter and receiver equipment $TX_1$ and $RX_1$ respectively at a first station, and transmitter and receiver equipment $TX_2$ and $RX_2$ respectively at a second station spaced at an unknown distance from the first station;

b. control means at the first station responsive to reception of $f_2$ by $RX_1$ to inhibit $TX_1$ transmission of $f_1$, and to absence of reception of $f_2$ by $RX_1$ to effect $TX_1$ transmission of $f_1$, and c. measuring means operable to determine the rate at which $TX_1$ is repeatedly effected and inhibited, that rate being directly related to the unknown distance.

Accordingly, it will be seen that the resulting onoff rate defines a distance-related frequency $f_d$, in that $f_d$ is inversely related to the distance $d$ between the stations. If there are no delays in the transmitting and receiving equipment, high count rates will be obtained at short distances and this frequency or rate will decrease as the separation distance increases between the two stations.

Additional features and objects of the invention include the provision of other control means at the second station responsive to reception of $f_1$ by $RX_2$ to enable $TX_2$, and to absence of reception of $f_1$ by $RX_2$ to disable $TX_2$, separation in frequency of $f_2$ and $f_1$ being required to minimize interference between receiver and associated transmitter at each location; and a voice link between the two locations is readily obtained providing full duplex capability.

These and other objects and advantages of the invention will be more fully understood from the following description and drawings, in which:

DRAWING DESCRIPTION

DETAILED DESCRIPTION

Figure 1:
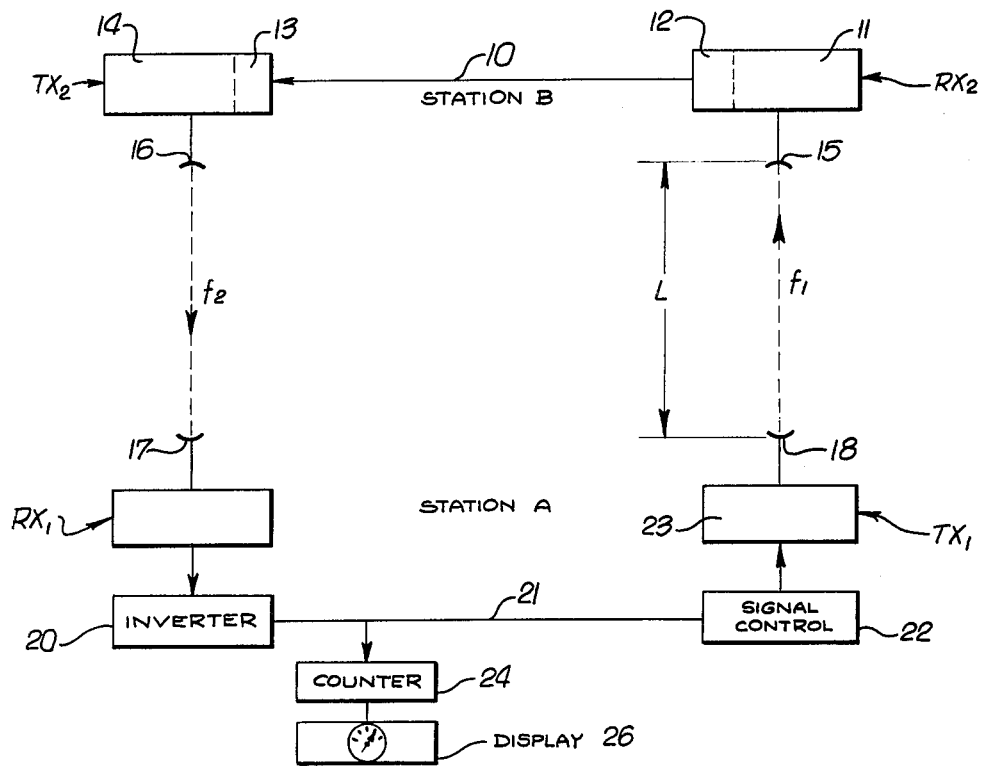
FIG. 1 is a block diagram illustrating one form of the invention.

Referring first to FIG. 1, a master station A and slave station B are separated by distance L, as indicated, which is to be accurately determined. Transmitting and receiving equipment $TX_1$ and $RX_1$ is at station A, while transmitting and receiving equipment $TX_2$ and $RX_2$ is located at station B.

Assuming an on-off amplitude modulation mode of operation, $TX_1$ transmits a radio signal such as carrier frequency $f_1$ for reception by $RX_2$, and $TX_2$ transmits a radio signal such as carrier frequency $f_2$ for reception by $RX_1$. $TX_2$ is connected at 10 with $RX_2$ in such manner that $TX_2$ transmits carrier $f_2$ in response to reception by $RX_2$ of carrier $f_1$ transmitted by $TX_1$. In this regard receiver equipment $RX_2$ may include suitable conventional demodulation stages at 11 and a control switching stage at 12 so as to produce a switch-on signal on connection 10 when $f_1$ is received by $RX_2$. Likewise, transmit equipment $TX_2$ may include a suitable control stage 13 to turn on the r.f. generator 14 in response to reception of the signal on connection 10. If desired, the operation may be such that generator 14 only operates during maintenance of the bias signal on connection 10, so that generator 14 stops generating $f_2$ when $f_1$ ceases to be transmitted. Antennas associated with $RX_2$, $TX_2$, $RX_1$ and $TX_1$ are indicated at 15–18.

At station A, control means is operable in response to reception of $f_2$ by $RX_1$ to disable or inhibit $TX_1$ transmission of $f_1$, and to absence of reception of $f_2$ by $RX_1$ to enable or actuate $TX_1$ transmission of $f_1$. Such control means may for example include the phase inverter 20 connected with $RX_1$ to produce a negative switching pulse at 21 in response to reception of $f_2$, and a control stage 22 to turn off the r.f. generator 23 portion of $TX_1$ upon reception of the negative pulse. Likewise, when $f_2$ ceases to be received by $RX_1$, the inverter produces a positive step function at 21, and the control stage 22 responds to turn on the r.f. generator 23. Elements 12 and 13 at the station B may be considered as other control means responsive to reception of $f_1$ by $RX_2$ to enable $TX_2$, and to absence of reception of $f_1$ by $RX_2$ to disable $TX_2$. In this regard, $f_2$ and $f_1$ are sufficiently offset from one another as to preclude interference therebetween.

It will be observed that the process of turning each transmitter-receiver combination on and off completes one cycle, and the rate at which this occurs is a function of the delays in the system and the distance of separation of the stations. The rate or frequency of on-off cycling would be inversely related to the distance L between stations, assuming no delays in the transmitting and receiving equipment. For example, by doubling the distance L, the resulting frequency would be halved. Delay by $RX_2$ is a function of receiver bandwidth.

In this regard, the invention also contemplates the provision of measuring means operable to determine the rate at which $TX_1$ is repeatedly enabled and disabled, which is the same as the system on-off rate referred to. For example, the measuring means may include a rate indicator such as a counter 25 to which the on-off voltage steps or signal at 21 is transmitted. A display 26 may be connected with the counter to indicate the on-off signals per unit time, and for this purpose, appropriate rate circuitry may be provided in the display or the counter itself. The display may also be calibrated into distance L, which is a function of count rate, as described, conversion tables also being usable.

From a design standpoint, delay variations in the equipment should be held to a minimum if accurate measurements are to be obtained. These variations are further minimized by the relatively long integration time associated with operation of the counter. Delay variations contributed by the equipment are also reduced if such variation has a zero mean and a Gaussian distribution. If these conditions are met, the variation is reduced by the square root of the number of measurements, each "measurement" being one complete on-off cycle. For example, a cycle frequency of 1 million Hz would have the effect of reducing the variations in the equipment by 1,000.

With this technique, it is not necessary to have a precise trigger point on each cycle for the counter, the latter needing only to determine the number of cycles in a specific time interval, with a possible error of one count which is typical of counting operations and will not affect, markedly, the results.

Figure 2:
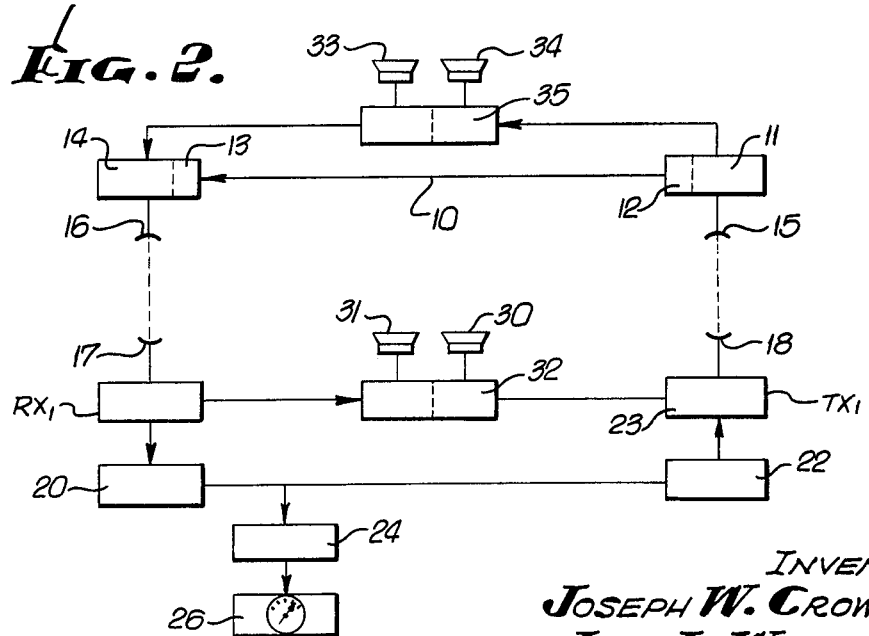
FIG. 2 is a block diagram illustrating another form of the invention.

FIG. 2 shows the same system as in FIG. 1, with the inclusion of means at the stations A and B to modulate $f_1$ and $f_2$ in accordance with voice produced audio frequency variations, and to demodulate the modulated $f_1$ and $f_2$ to reproduce the audio frequency variations, for voice communication between stations. Such means may include the station A microphone, speaker and modulation-demodulation apparatus 30–32 connected between $RX_1$ and $TX_1$, and the station B microphone, speaker and modulation-demodulation apparatus 33–35 connected between $RX_2$ and $TX_2$.

Additional advantages features of the invention should be noted: the modulation method is not critical, i.e. amplitude modulation, frequency modulation and frequency shift modulation may be used. Additionally, the carrier frequency selection is not critical, excepting for maintaining sufficient isolation (frequency offset) to permit proper equipment operation. Drift of the carrier frequency does not degrade system performance, so long as it stays within the passband of the receiver. Further, no mutual frequency relationship need be maintained anywhere in the equipment, and no range measurement ambiguity exists with this technique.

To obtain best results; it is desirable to have at least 1 MHZ bandpass in the overall system, and preferably 5 to 10 MHZ. This is best shown in the following table, giving a comparison of accuracy potential with range variations and bandpass of the receiver-transmitter combinations. Note that the higher the receiver and transmitter bandwidth, the higher the accuracy, in terms of feet per count (F/C). The column at the left indicates station A to station B distance.

RECEIVER BANDWIDTH TABLE

| distance in feet | 100 KHZ | 500 KHZ | 1 MHZ | 5 MHZ | 10 MHZ |
|---|---|---|---|---|---|
| 100 | (40.4) | (8.4) | (4.4) | (1.2) | (0.8) |
| (.1) | 0.4 F/C | 0.02 F/C | 0.0066 F/C | 0.0008 F/C | 0.00047 F/C |
| 500 | (42) | (10) | (6) | (2.8) | (2.4) |
| (.5) | 0.5 F/C | 0.03 F/C | 0.012 F/C | 0.0033 F/C | 0.0026 F/C |
| 1000 | (44) | (12) | (8) | (4.8) | (4.4) |
| (1) | 0.66 F/C | 0.08 F/C | 0.048 F/C | 0.025 F/C | 0.022 F/C |
| 5000 | (60) | (28) | (24) | (20.8) | (20.4) |
| (5) | 1.2 F/C | 0.34 F/C | 0.26 F/C | 0.21 F/C | 0.206 F/C |

We claim:

1. Apparatus for accurately determining the distance between first and second spaced stations, comprising
   a. transmitter and receiver equipment $TX_1$ and $RX_1$ respectively at the first station, and transmitter and receiver equipment $TX_2$ and $RX_2$ respectively at the second station, $TX_2$ being operable to transmit carrier frequency $f_2$ to $RX_1$ in response to reception by $RX_2$ of a carrier frequency $f_1$ transmitted by $TX_1$,
   b. control means at the first station responsive to reception of $f_2$ by $RX_1$ to disable $TX_1$ transmission of $f_1$, and to absence of reception of $f_2$ by $RX_1$ to enable $TX_1$ transmission of $f_1$, and
   c. measuring means operable to determine the rate at which $TX_1$ is repeatedly enabled and disabled, which rate is a function of said distance.

2. The apparatus of claim 1 wherein other control means at the second station includes demodulation and control switching stages responsive to reception of $f_1$ by $RX_2$ to enable $TX_2$, and to absence of reception of $f_1$ by $RX_2$ to disable $TX_2$.

3. The apparatus of claim 2 wherein $f_2$ is sufficiently offset from $f_1$ so as not to interfere therewith.

4. The apparatus of claim 1 wherein said measuring means includes an indicator to indicate said rate.

5. The apparatus of claim 4 wherein said indicator comprises a counter.

6. The apparatus of claim 1 wherein said control means includes an inverter operable to produce a phase inverted signal in response to $RX_1$ reception of $f_2$.

7. The apparatus of claim 1 including means at said stations to modulate $f_1$ and $f_2$ in accordance with voice produced audio frequency variations, and to demodulate the modulated $f_1$ and $f_2$ to reproduce said audio frequency variations, for voice communication between the stations.

* * * * *